United States Patent [19]

Brust

[11] 4,249,565
[45] Feb. 10, 1981

[54] TIMED WATER SHUT OFF SYSTEM

[76] Inventor: Russell E. Brust, 216 Maureen Cir., Pittsburgh, Calif. 94565

[21] Appl. No.: 132,638

[22] Filed: Mar. 21, 1980

Related U.S. Application Data

[63] Continuation-in-part of Ser. No. 947,883, Oct. 2, 1978, abandoned.

[51] Int. Cl.$^3$ ............................................. F16K 31/02
[52] U.S. Cl. ................................ 137/495; 137/624.11; 137/487.5
[58] Field of Search ...................... 137/624.11, 624.12, 137/495, 487.5; 251/15

[56] References Cited

U.S. PATENT DOCUMENTS

| | | | |
|---|---|---|---|
| 2,877,467 | 3/1959 | Cloud | 137/624.11 X |
| 3,416,560 | 12/1908 | Bruno | 137/487.5 X |
| 3,843,056 | 10/1974 | Nye | 137/624.11 |

Primary Examiner—Alan Cohan
Attorney, Agent, or Firm—Daniel Jay Tick

[57] ABSTRACT

A sensing valve is provided in a water supply pipe upstream of a solenoid-closed valve. A sensing switch coupled to the sensing valve is controlled in position by such valve. A normally open timer switch is coupled to a timer and maintained open by the timer in accordance with the setting of the timer and during energization of the timer. The timer switch is closed upon the timing out of the timer and opened manually. The sensing switch, the timer and a source of electrical energy are electrically connected to a first circuit whereby a flow of water in the water supply pipe at the sensing valve opens the sensing valve and closes the sensing switch to energize the timer. The source of electrical energy, the timer switch and the solenoid-closed valve are electrically connected in a second circuit whereby the sensing valve activates the timer and after the lapse of the period of time for which the timer is set, the timer closes the timer switch thereby energizing the solenoid-closed valve to close the valve to prevent a flow of water to the structure.

1 Claim, 3 Drawing Figures

TIMED WATER SHUT OFF SYSTEM

BACKGROUND OF THE INVENTION

This is a continuation-in-part of application Ser. No. 947,883, filed Oct. 2, 1978, for "Water Shut Off System", and now abandoned.

The present invention relates to a water shut off system. More particularly, the invention relates to a water shut off system for preventing a flow of water to a structure after the lapse of a predetermined period of time after a flow of water to the structure commences. The water shut off system has a water supply pipe with a solenoid-closed valve therein for selectively permitting and preventing a water flow through the pipe to the structure.

Water shut off systems are described in the following U.S. patents. U.S. Pat. No. 2,231,569, issued Feb. 11, 1941 to Gorrie, U.S. Pat. No. 2,912,997, issued Nov. 17, 1959 to Griswold, U.S. Pat. No. 3,255,785, issued Dec. 28, 1965 to Goike, U.S. Pat. No. 3,252,479, issued May 24, 1966 to Klock, Jr., U.S. Pat. No. 3,416,560, isued Dec. 17, 1968 to Bruno and U.S. Pat. No. 3,952,759, issued Apr. 27, 1976 to Ottenstein.

The principal object of the invention is to provide a water shut off system for preventing a supply of water to a structure after the lapse of a selected period of time commencing with the start of operation of a water-using unit.

An object of the invention is to provide a water shut off system of simple structure, which is inexpensive in manufacture, for preventing a supply of water to a structure after the lapse of a selected period of time commencing with the start of operation of a water-using unit.

Another object of the invention is to provide a water shut off system which is installed with facility and convenience in structures of all type and ages.

Still another object of the invention is to provide a water shut off system which functions efficiently, effectively and reliably to prevent a supply of water to a structure after the lapse of a selected period of time commencing with the start of operation of a water-using unit thereby preventing flooding of the structure in the event of malfunction of such unit.

BRIEF SUMMARY OF THE INVENTION

In accordance with the invention, a water shut off system for preventing a flow of water to a structure after the laps of a predetermined period of time after a flow of water to the structure commences, said water shut off system having a water supply pipe with a solenoid-closed valve therein for preventing a water flow through the pipe to the structure, comprise a sensing valve in the water supply pipe upstream of the solenoid-closed valve. A sensing switch is coupled to the sensing valve and controlled in position by the sensing valve. A source of electrical energy is provided. A timer has a device for manually setting it to time out after a set time. A normally open timer switch is coupled to the timer and maintained open by the timer in accordance with the setting of the timer and during energization of the timer. The timer switch is closed upon the timing out of the timer and opened manually. A first plurality of electrical conductors electrically connect the sensing switch, the source of electrical energy and the timer in a first circuit whereby a flow of water in the water supply pipe at the sensing valve opens the sensing valve and closes the sensing switch thereby energizing the timer. A second plurality of electrical conductors electrically connect the source of electrical energy, the timer switch and the solenoid-closed valve in a second circuit whereby the sensing valve activates the timer and after the lapse of the period of time for which the timer is set, the timer closes the timer switch thereby energizing the solenoid-closed valve to close the solenoid-closed valve to prevent a flow of water to the structure.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The water shut off system of the invention prevents a flow of water to a structure after the lapse of a predetermined period of time after a flow of water to the structure commences. The structure is not shown in the FIGS. The water shut off system has a water supply pipe 1 (FIGS. 2 and 3) with a solenoid-closed valve 2 therein (FIGS. 1 and 3) for selectively permitting and preventing a water flow through the pipe to the structure, in the usual manner of a solenoid-closed valve. The water shut off system of the invention comprises a sensing valve 3 (FIGS. 1 and 3) in the water supply pipe 1 upstream of the solenoid-closed valve, as indicated by the broken-lined arrows 4 and 5 of FIG. 3.

Figure 1:
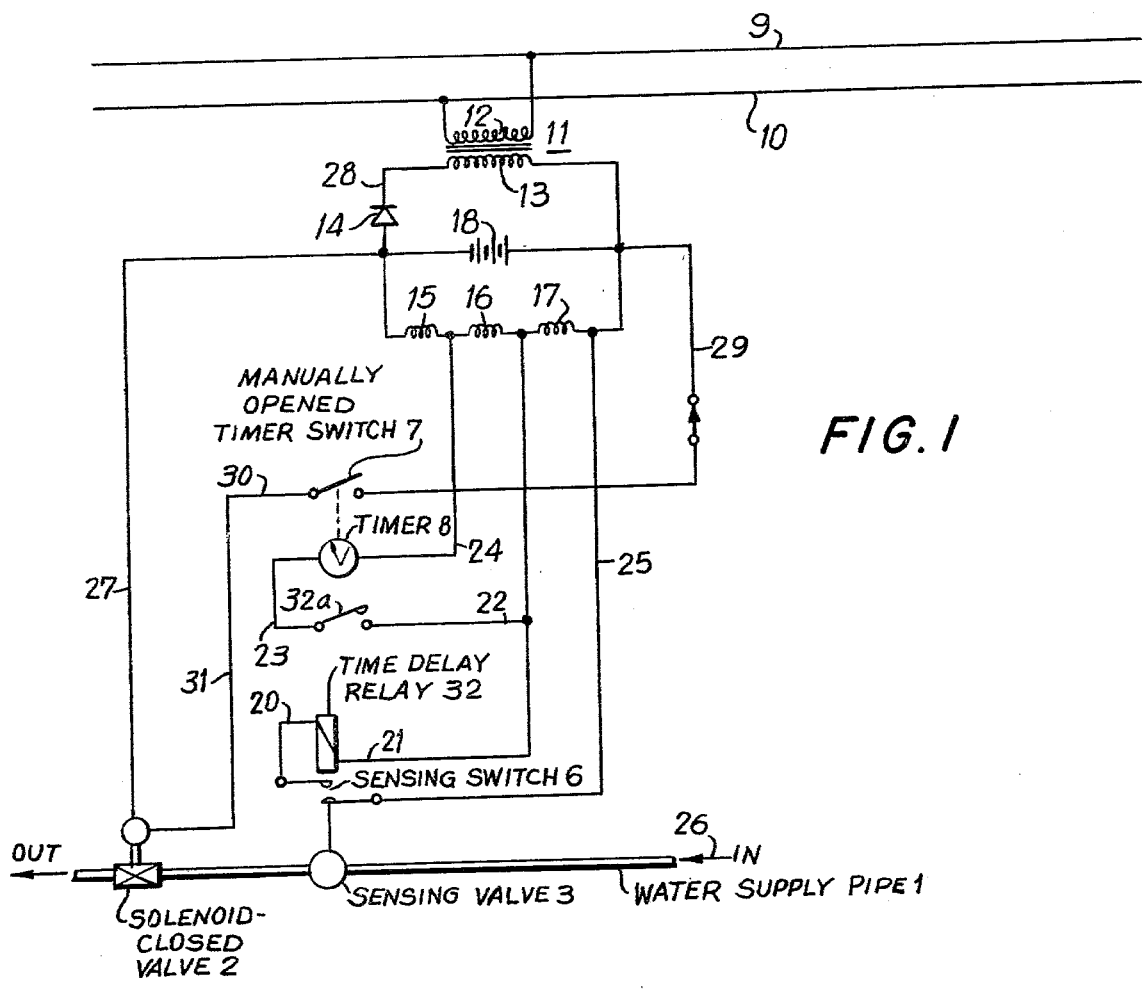
FIG. 1 is a circuit diagram of an embodiment of the water shut off system of the invention.
Figure 2:
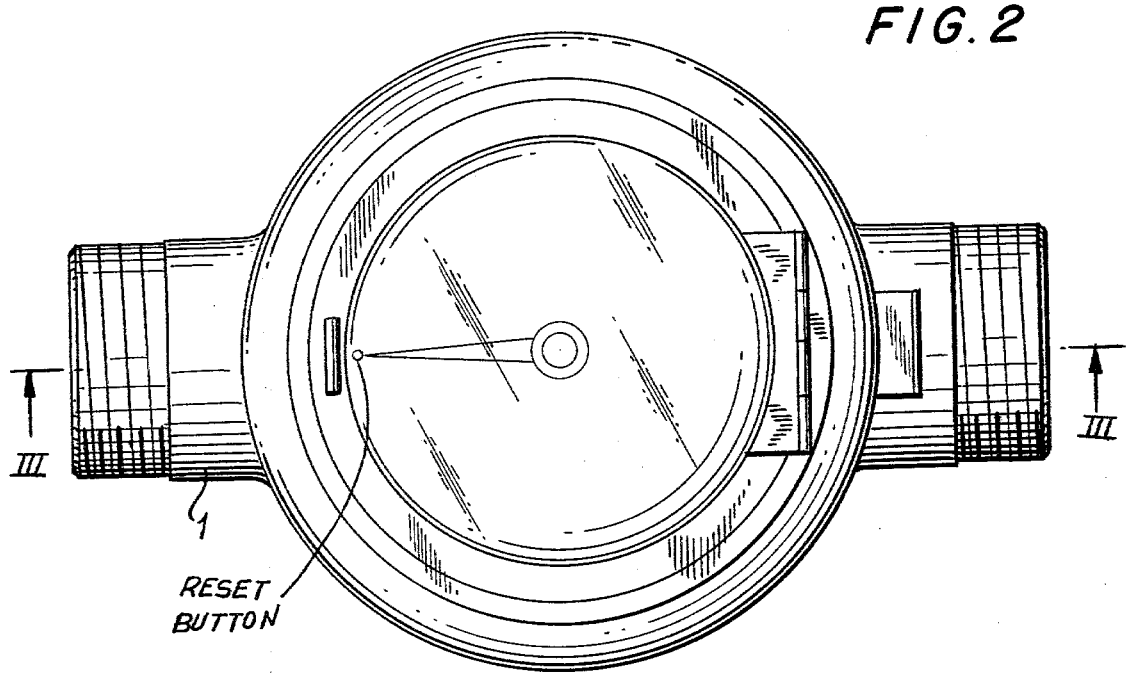
FIG. 2 is a view, on an enlarged scale, of the water supply shut off system of the invention.

A sensing switch 6 is coupled to the sensing valve 3 and is controlled in position by said snesing valve. A timer switch 7 is coupled to a timer 8 of any suitable type and is controlled in position by said timer, as shown in FIG. 1. The timer 8 is manually set to time out after a set time and the timer switch 7 is normally open and maintained open by the timer, closed in accordance with the setting of the timer and during energization of said timer. The timer switch 7 is closed upon the timing out of the timer. The timer switch 7 is then reset, or opened, manually.

A source of electrical energy may comprise a commercial power source which supplies the electrical energy via a pair of electrical conductors 9 and 10 and a transformer 11 having a primary winding 12 connected to said conductors and a secondary winding 13. The secondary winding 13 is connected in a closed loop with a rectifier 14 and a voltage divider 15, 16, 17. A battery 18 functions as a source of electrical energy for normal operation in the event of a loss of AC power. The battery 18 is charged by the transformer 11 via the rectifier 14, as shown in FIG. 1.

A first plurality of electrical conductors 25, 20, 21 electrically connect the sensing switch 6 in a first circuit with a relay 32 and the source of electrical energy 17, as shown in FIG. 1. The source of electrical energy 17 energizes the relay 32, thereby closing relay contacts 32a after a time delay. The purpose of the time delay relay 32 is to prevent undue cycling of the motor of the timer 8. Neither the battery 18 nor the time delay relay 32 is essential to the operation of the water shut off system of the invention. When the relay contacts 32a are closed, or in electrical contact, the timer 8 is electrically connected to the source of electrical energy 16 in a third circuit. Thus, a flow of water in the water supply pipe 1 in the direction of an arrow 26 in FIG. 1, at the sensing valve 3, opens said sensing valve and closes the sensing switch 6. The closing of the sensing switch 6 energizes the timer 8.

A second plurality of electrical conductors, 27, 28, 29, 30, 31 electrically connect the source of electrical energy 13, the timer switch 7 and the solenoid-closed valve 2 in a second circuit, shown in FIG. 1. The sensing valve 3 activates the timer 8. After the timer 8 is started by the sensing valve 3, and after the lapse of the period of time for which the timer is set, said timer closes the timer switch 7 thereby energizing the solenoid-closed valve 2 to close said valve thereby preventing a flow of water to the structure.

Figure 3:
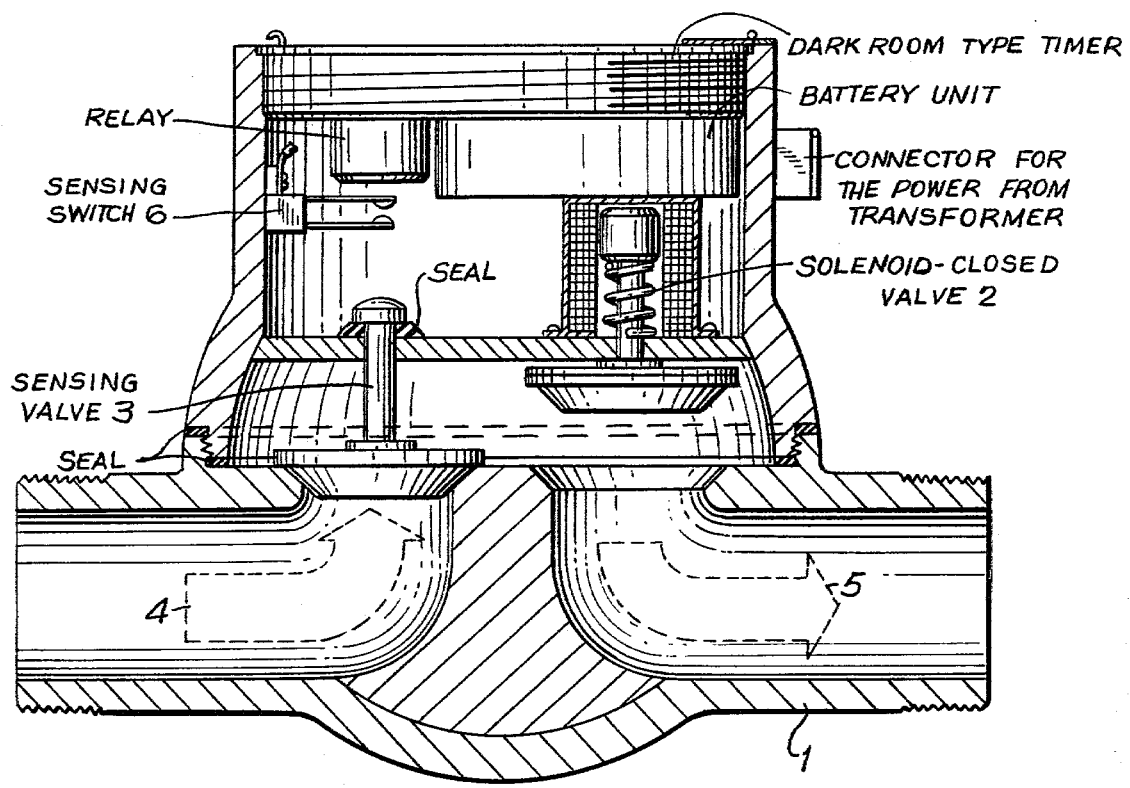
FIG. 3 is a view, partly in section, taken along the lines III—III, of FIG. 2.

As shown in FIG. 3, the sensing valve 3 is closed when no water is running. The solenoid-closed valve 2 has to be open so that the water pressure is on both sides of the sensing valve 3. When a water valve in the structure is opened, the water pressure below the sensing valve 3 opens said sensing valve, to activate the timer 8.

Initially, when there is no water flow, the sensing valve 3 is closed, thereby permitting the sensing switch 6 to be open, so that the time delay relay 32 is deenergized. Since the time delay relay 32 is deenergized, it maintains its relay contacts 32a open, so that the motor of the timer 8 is deenergized, thereby maintaining the timer switch 7 open. When the timer switch 7 is open, the solenoid of the solenoid-closed valve 2 is deenergized and the bias spring of said solenoid-closed valve maintains said valve open.

The power supply 11, 14 provides a rectified DC voltage to maintain the battery 18 charged and to provide power for the operating circuitry via the voltage divider 15, 16, 17.

When there is a water flow, the sensing valve 3 opens and closes the sensing switch 6, so that the time delay relay 32 is energized. A preset period of time after the time delay relay 32 is energized, said relay closes its relay contacts 32a, thereby energizing the motor of the timer 8. A manually set period of time after the timer 8 is energized, it closes the timer switch 7, which energizes the solenoid of the solenoid-closed valve 2, thereby closing said valve. This shuts off the water flow and thus permits the sensing valve 3 to close, thereby opening the sensing switch 6.

When the sensing switch 6 is opened, the time delay relay 32 is deenergized and opens its relay contacts 32a, thereby deenergizing the motor of the timer 8. The timer 8 is then spring-reset to a manually set time.

The timer switch 7 remains closed until it is manually opened, which causes the deenergization of the solenoid of the solenoid-closed valve 2, permitting the bias spring of said valve to open said valve. This returns the system to its initial ready condition.

If the water does not flow long enough to permit the time delay relay 32 to close its relay contacts 32a, then, as soon as the water stops flowing, the sensing valve 3 closes, opening the sensing switch 6, and said time delay relay is deenergized and returns to its initial condition. If the water does not flow long enough to permit the timer 8 to time out and close the timer switch 7, then, as soon as the water stops flowing, the sensing valve 3 closes, opening the sensing switch 6, and the time delay relay 32 is deenergized and opens its relay contacts 32a. When the relay contacts 32a are opened, the motor of the timer 8 is deenergized and said timer is spring-returned to the manually set time.

The timer 8, the source of electrical energy 16 and the relay contacts 32a are connected in circuit by electrical conductors 22, 23, 24, as shown in FIG. 1.

While the invention has been described by means of a specific example and in a specific embodiment, I do not wish to be limited thereto, for obvious modifications will occur to those skilled in the art without departing from the spirit and scope of the invention.

I claim:

1. A water shut off system for preventing a flow of water to a structure after the lapse of a predetermined period of time after a flow of water to the structure commences, said water shut off system having a water supply pipe with a solenoid-closed valve therein for preventing a water flow through the pipe to the structure, said water shut off system comprising
   a sensing valve in the water supply pipe upstream of the solenoid-closed valve constructed so as to open in response to flow through said pipe;
   a normally open sensing switch coupled to the sensing valve and constructed so as to close in response to opening of said sensing valve;
   a source of electrical energy;
   a timer having means for manually setting it to time out after a set time;
   a normally open timer switch coupled to said timer and maintained open by said timer in accordance with the setting of said timer and during energization of said timer, said timer switch being closed upon the timing out of said timer and opened manually;
   a first plurality of electrical conductors electrically connecting the sensing switch, the source of electrical energy and the timer in a first circuit whereby a flow of water in the water supply pipe at the sensing valve opens said sensing valve and closes the sensing switch thereby energizing the timer; and
   a second plurality of electrical conductors electrically connecting the source of electrical energy, the timer switch and the solenoid-closed valve in a second circuit whereby the sensing valve activates the timer and after the lapse of the period of time for which the timer is set, said timer closes the timer switch thereby energizing the solenoid-closed valve to close said solenoid-closed valve to prevent a flow of water to the structure.

* * * * *